United States Patent
Perez et al.

(10) Patent No.: US 6,235,850 B1
(45) Date of Patent: May 22, 2001

(54) EPOXY/ACRYLIC TERPOLYMER SELF-FIXTURING ADHESIVE

(75) Inventors: Mario Alberto Perez, Burnsville; Ahmed Salih Abuelyaman, Woodbury; Ikuko Ebihara, St. Paul; Lani S. Kangas, Woodbury, all of MN (US)

(73) Assignee: 3M Immovative Properties Company, Saint Paul, MN (US)

( * ) Notice: Subject to any disclaimer, the term of this patent is extended or adjusted under 35 U.S.C. 154(b) by 0 days.

(21) Appl. No.: 09/209,971

(22) Filed: Dec. 11, 1998

(51) Int. Cl.[7] ................... C08F 220/18; C08F 220/32; C08L 33/08; C08L 33/10; C08L 33/14
(52) U.S. Cl. ................ 525/384; 526/326; 526/328.5; 526/273; 525/186; 525/523; 525/534; 525/327.3; 525/561
(58) Field of Search ................... 525/118, 107, 525/451, 534, 532, 186, 109, 523, 384, 327.3; 524/561; 526/326, 328.5, 273

(56) References Cited

U.S. PATENT DOCUMENTS

| | | | |
|---|---|---|---|
| 3,312,754 | 4/1967 | Marks et al. | 260/837 |
| 4,199,646 | 4/1980 | Hori et al. | 428/344 |
| 4,250,053 | 2/1981 | Smith | 252/426 |
| 4,256,828 | 3/1981 | Smith | 430/280 |
| 4,684,678 | 8/1987 | Schultz et al. | 523/466 |
| 5,059,701 | 10/1991 | Keipert | 556/13 |
| 5,086,088 | 2/1992 | Kitano et al. | 522/170 |
| 5,191,101 | 3/1993 | Palazzotto et al. | 556/47 |
| 5,202,401 | 4/1993 | Yokoi . | |
| 5,252,694 | 10/1993 | Willett et al. | 525/404 |
| 5,883,193 | * 3/1999 | Karim | 525/113 |

FOREIGN PATENT DOCUMENTS

| | | |
|---|---|---|
| 2 240 548 | 8/1991 | (GB) . |
| 63-260978 | 10/1988 | (JP) . |
| 1-252682 | 10/1989 | (JP) . |
| 5-125150 | 5/1993 | (JP) . |
| WO 98/08906 | 3/1998 | (WO) . |
| WO 98/47046 | 10/1998 | (WO) . |

* cited by examiner

*Primary Examiner*—Bernard Lipman
*Assistant Examiner*—Kelechi Egwim
(74) *Attorney, Agent, or Firm*—Philip Y. Dahl

(57) ABSTRACT

A (meth)acrylate terpolymer is provided comprising 1–30% of total terpolymer weight epoxy-functional (meth)acrylate monomer units, 1–98% of total terpolymer weight tackifier (meth)acrylate monomer units, and 1–98% of total terpolymer weight compatibilizing (meth)acrylate monomer units, wherein said compatibilizing (meth)acrylate monomer unit is a (meth)acrylic ester derived from an aromatic alcohol containing 6-14 carbon atoms. Also provided are self-fixturing adhesive compositions comprising the acrylate terpolymer of the present invention and methods of their use.

4 Claims, No Drawings

EPOXY/ACRYLIC TERPOLYMER SELF-FIXTURING ADHESIVE

FIELD OF THE INVENTION

This invention relates to components of self-fixturing adhesive compositions and methods of their use. The material of the present invention includes an acrylic terpolymer component comprising:

a) 1–30% of total terpolymer weight epoxy-functional (meth)acrylate monomer units, b) 1–98% of total terpolymer weight tackifier (meth)acrylate monomer units, and c) 1–98% of total terpolymer weight compatibilizing (meth)acrylate monomer units, wherein said compatibilizing (meth)acrylate monomer unit is a (meth)acrylic ester derived from an aromatic alcohol containing 6–14 carbon atoms.

BACKGROUND OF THE INVENTION

U.S. Pat. No. 5,086,088 concerns PSA-thermoset adhesives comprising blends of acrylic esters and epoxy resins. This reference does not disclose acrylic esters having epoxy functionality.

U.S. Pat. No. 3,312,754 concerns a liquid elastic adhesive comprising an epoxy resin and a butadiene-acrylonitrile-carboxyl terpolymer, wherein the carboxyl groups of the terpolymer will react with the epoxy groups. This reference does not disclose acrylic esters having epoxy functionality.

U.S. Pat. No. 4,199,646 concerns a PSA comprising an epoxy resin and a copolymer of an acrylic ester and a prepolymer having carboxyl, hydroxyalkyl, glycidyl or methylol functions. No terpolymer including a compatibilizing monomer is disclosed.

JP 63-260978 and JP 1-252682 concern PSAs including an acrylic copolymer that contains an epoxy group. No terpolymer including a compatibilizing monomer is disclosed. These references suggest mixing high Mw acrylic copolymer with low amounts of epoxy resin, preferably 1–10% by weight, to form a solid composition.

SUMMARY OF THE INVENTION

Briefly, the present invention provides an acrylate terpolymer comprising: 1–30% of total terpolymer weight epoxy-functional (meth)acrylate monomer units, 1–98% of total terpolymer weight tackifier (meth)acrylate monomer units, and 1–98% of total terpolymer weight compatibilizing (meth)acrylate monomer units, wherein said compatibilizing (meth)acrylate monomer unit is a (meth)acrylic ester derived from an aromatic alcohol containing 6–14 carbon atoms.

The terpolymer is compatible with epoxy resin in a blend to form an improved one-part, solventless self-fixturing adhesive.

In another aspect, the present invention provides a one-part, solventless self-fixturing adhesive or hardenable PSA.

What has not been described in the art, and is provided by the present invention, is a self-fixturing adhesive or hardenable PSA comprising an epoxy resin and an acrylate terpolymer having epoxy functionality and comprising tackifying and compatibilizing monomer units.

In this application:

"epoxy-functional (meth)acrylate monomer" means a monomer of formula I:

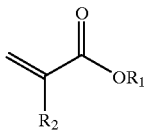

where $R_2$ is H or $CH_3$ and where $R_1$ comprises an epoxy group;

"tackifier (meth)acrylate monomer" means a monomer of formula I, above, where $R_2$ is H or $CH_3$ and $R_1$ comprises a monovalent derivative of a tackifier, preferably a straight-chain, branched, cyclic or polycyclic hydrocarbon;

"compatibilizing (meth)acrylate monomer" means a monomer of formula I, above, where $R_2$ is H or $CH_3$ and $R_1$ comprises a monovalent derivative of an aromatic group of between 6 and 14 carbons, preferably also comprising one or more ether linkages;

"monomer unit" means a portion of a polymer derived from a single monomer;

"curing agent", for epoxy resin, means an epoxy curative or an epoxy catalyst;

"self-fixturing adhesive" and "hardenable PSA" are used interchangeably to mean a substance which is useful as a pressure sensitive adhesive (PSA) in its uncured state and which, after positioning, may then be cured by light, heat, or other means to become a structural adhesive;

"substituted" means substituted by conventional substituents which do not interfere with the desired product, e.g., substituents can be alkyl, alkoxy, aryl, phenyl, halo (F, Cl, Br, I), cyano, nitro, etc.

It is an advantage of the present invention to provide an acrylate terpolymer which is compatible with epoxy resins in a blend, even in equal amounts, to form a one-part, solventless PSA-thermoset adhesive.

DETAILED DESCRIPTION OF PREFERRED EMBODIMENTS

The present invention provides an acrylate terpolymer comprising: 1–30% of total terpolymer weight epoxy-finctional (meth)acrylate monomer units, 1–98% of total terpolymer weight tackifier (meth)acrylate monomer units, and 1–98% of total terpolymer weight compatibilizing (meth)acrylate monomer units, wherein said compatibilizing (meth)acrylate monomer unit is a (meth)acrylic ester derived from an aromatic alcohol containing 6–14 carbon atoms, which is compatible with epoxy resin in a blend to form an improved one-part, solventless self-fixturing adhesive.

The acrylate terpolymer can be made by any appropriate means to polymerize (meth)acrylate monomers, many of which are known in the art. Preferred methods include mixing the monomers in the presence of a free radical initiator such as 2,2'-azobisisobutyronitrile (AIBN). Thermal intiators useful in preparing acrylates included in the invention include, but are not limited to, azo, peroxide, persulfate and redox initiators.

Suitable azo initiators include, but are not limited to, 2,2'-azobis(4-methoxy-2,4-dimethylvaleronitrile) (VAZO™ 33), 2,2'-azobis(2-amidinopropane) dihydrochloride (VAZ™ 50), 2,2'-azobis(2,4-dimethylvaleronitrile) (VAZ™ 52), 2,2'-azobis(isobutyronitrile) (AIBN, VAZO™64), 2,2'-azobis(2-methylbutyronitrile) (VAZ™67), and 1,1'-azobis(1-cyclohexanecarbonitrile) (VAZO™88), all of which are available from DuPont Chemicals, Wilmington, DE, and 2,2'-azobis(methyl isobutyrate) (V-601™), available from Wako Chemicals USA Inc., Richmond, Va.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl)peroxydicarbonate (PERKADOX™ 16), available from Akzo, Nobel Chemicals, Inc., Chicago, Ill., di(2-ethylhexyl)peroxydicarbonate, t-butylperoxypivalate (Lupersol™ 11), available from Elf Atochem North America, Philadelphia, PA, t-butylperoxy-2-ethylhexanoate (Trigonox™ 21-C50), available from Akzo, Nobel Chemicals, Inc., and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based upon organic peroxides and tertiary amines, such as benzoyl peroxide plus dimethylaniline; and systems based on organic hydroperoxides and transition metals, such as cumene hydroperoxide plus cobalt naphthenate.

Other initiators include, but are not limited to, pinacols, such as teteraphenyl-1,1,2,2-ethanediol.

Preferred thermal free radical initiators are selected from the group consisting of azo compounds.

The initiator is present in a catalytically-effective amount and such amounts are typically in the range of from about 0.01 parts to 10 parts, and more preferably in the range of from about 0.025 parts to about 2 parts by weight, based upon 100 total parts by weight of the total formulation. If a mixture of intiators is used, the total amount of the mixture of initiators would be as if a single initiator was used.

Photoinitiators that are useful for polymerizing alkyl acrylate monomers include benzoin ethers, such as benzoin methyl ether or benzoin isopropyl ether; substituted benzoin ethers, such as anisoin methyl ether; substituted acetophenones, such as 2,2-diethoxyacetophenone and 2,2-dimethoxy-2-phenylacetophenone; substituted alpha-ketols, such as 2-methyl-2-hydroxypropiophenone; aromatic sulfonyl chlorides, such as 2-naphthalene-sulfonyl chloride; bis-acyl phosphine oxides, such as bis-(2,6-dimethoxybenzoyl)-2,4,4-trimethylpentylphosphine oxide and 2,4,6-trimethylbenzoyl diphenyl phosphine oxide; photoactive oximes, such as 1-phenyl-1,1-propanedione-2-(o-ethoxycarbonyl)oxime; and mixtures thereof. They may be used in amounts, which as dissolved provide about 0.001 to 0.5 percent by weight of the alkyl acrylate monomer, preferably at least 0.01 percent.

Optionally, it is within the scope of this invention to include photosensitizers or photoaccelerators in the radiation-sensitive compositions. Use of photosensitizers or photoaccelerators alters the wavelength sensitivity of radiation-sensitive compositions employing the latent catalysts of this invention. Use of a photosensitizer or photoaccelerator increases the radiation sensitivity allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of the reference, S. L. Murov, *Handbook of Photochemistry*, Marcel Dekker Inc., N.Y., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 parts, by weight of photosensitizer or photoaccelerator per part of photoinitiator.

The molecular weight of the resulting terpolymer is preferably greater than 3000, for good adhesive properties, but preferably not so high as to hinder blending of acrylate and epoxy resin components. More preferably, the molecular weight of the terpolymer component is between 5,000 and 30,000. Most preferably, the molecular weight of the terpolymer component is between 7,000 and 15,000. If the Tg is too high, the mixture will be difficult to apply at room temperature. If the Tg is too low, the high heat resistance of the adhesive may be decreased. Preferably, the Tg of the terpolymer is between –80° C. and 70° C., and more preferably between –30° C. and 40° C.

The epoxy-functional (meth)acrylate monomer can be any suitable monomer as defined above and may be substituted as defined above. Preferably the $R_1$ group is based on a straight-chain, branched, cyclic or polycyclic hydrocarbon of between 2–30 carbons having an oxirane (epoxy) group included. More preferably, the $R_1$ group contains between 3–10 carbons, such as glycidylmethacrylate (GMA). Most preferred species contain an epoxycyclohexyl group such as 3,4-epoxycyclohexylmethyl acrylate and 3,4-epoxycyclohexylmethyl methacrylate, the acrylic acid monoester of poly(Bisphenol-A diglycidyl ether), commercially available as Ebecryl™ 3605, from Rad-Cure Corp., Fairfield, N.J., and species having $R_1$ according to the formula: $-[(CH_2)_5C(O)O]_n-CH_2-$ epoxycyclohexyl, wherein n is 0 to 10 and preferably 1–4. Epoxy-finctional (meth)acrylate monomers useful in the invention include the acrylic acid monoester of poly(Bisphenol-A diglycidyl ether), commercially available as Ebecryl™ 3605, from Rad-Cure Corp., Fairfield, N.J., and the polyesters comprising (meth)acrylic acid, caprolactone or valerolactone or cyclooctanone lactone, and epoxidized cyclohexane derivatives such as 3,4-epoxycyclohexylmethanol, 3,4-epoxycyclohexane carboxylic acid, and 4,5-epoxycyclohexane-1,2-dicarboxylic acid, such as are described in Japanese Patent Application (Kokai) 5-125150.

The tackifier (meth)acrylate monomer can be any suitable monomer as defined above and may be substituted as defined above. The $R_1$ group may be derived from any known tackifier. Preferably $R_1$ is a straight-chain, branched, cyclic or polycyclic hydrocarbon of between 1–30 carbons; more preferably a straight-chain or branched alkyl group of between 1–30 carbons, and most preferably a straight-chain or branched alkyl group of between 6–20 carbons. Preferred tackifier (meth)acrylate monomers useful in the invention include methyl acrylate, methyl methacrylate, ethyl acrylate, isopropyl methacrylate, n-butyl acrylate, isooctyl acrylate, n-hexyl acrylate, 2-ethylhexyl acrylate, stearyl acrylate, octadecyl acrylate, isobornyl acrylate, tetrahydrofurfuryl acrylate, caprolactone acrylate, and allyl acrylate. More preferably, tackifier monomers include methyl methacrylate, n-butyl acrylate, isooctyl acrylate, 2-ethylhexyl acrylate, octadecyl acrylate, and isobornyl acrylate.

The compatibilizing (meth)acrylate monomer can be any suitable monomer as defined above and may be substituted as defined above. The $R_1$ compatibizing group is preferably a polar group but not an ionic or strongly basic group, since such a group would inhibit cationic cure of the epoxy. The $R_1$ group of the compatibilizing (meth)acrylate monomer contains an aromatic group, contains no ionic or strongly nucleophilic groups, and contains 6–14 carbons. Preferably, the $R_1$ group of the compatibilizing (meth)acrylate monomer contains a single phenyl ring. Exemplary monomers include phenyl acrylate, benzyl acrylate, phenylethyl acrylate, toluyl acrylate, tolylethyl acrylate, 2-tolyloxyethyl acrylate, and 2-phenoxyethyl acrylate (PEA). The $R_1$ group of the compatibilizing (meth)acrylate monomer preferably contains linking ether groups as well. Exemplary monomers include 2-toluyloxyethyl acrylate, and PEA. The compatibilizing monomer is most preferably PEA.

All of the (meth)acrylate monomers chosen are preferably those which do not inhibit cationic cure of the epoxy.

The terpolymer contains 1–30% of total terpolymer weight epoxyfunctional (meth)acrylate monomer units, preferably 2–20%, and more preferably 2–10%.

The terpolymer contains 1–98% of total terpolymer weight tackifier (meth)acrylate monomer units, preferably between 10–89%, more preferably between 30–80%, and most preferably between 30–40%.

The terpolymer contains 1–98% of total terpolymer weight compatibilizing (meth)acrylate monomer units, but preferably at least 10% and preferably less than 70%. More preferably the terpolymer contains 30–70% compatibilizing (meth)acrylate monomer units, and most preferably 50–70%.

The weights reported herein as percentages of total terpolymer weight reflect the weight ratios of monomers used in making the terpolymer.

The terpolymer may be used as an adhesive with or without addition of an epoxy resin component, but preferably with an added epoxy resin component. The epoxy resin comprises between 0 and about 80% of the adhesive blend; preferably between 20–80% and more preferably between 30 and 60% and most preferably between 40–60%.

The epoxy resin component may be comprised of epoxy monomers, epoxy oligomers having epoxy functions available for bonding, epoxy polymers having epoxy functions available for bonding, or any combinations thereof. The epoxy resin component of the invention preferably comprises compounds which contain one or more 1,2-, 1,3- and 1,4-cyclic ethers, which also may be known as 1,2-, 1,3-and 1,4-epoxides. The 1,2-cyclic ethers are preferred. Such compounds can be saturated or unsaturated, aliphatic, alicyclic, aromatic or heterocyclic, or can comprise combinations thereof. Compounds that contain more than one epoxy group (i.e., polyepoxides) are preferred.

Aromatic polyepoxides (i.e., compounds containing at least one aromatic ring structure, e.g., a benzene ring, and more than one epoxy group) that can be used in the present invention include the polyglycidyl ethers of polyhydric phenols, such as Bisphenol A-type resins and their derivatives, epoxy cresol-novolac resins, Bisphenol-F resins and their derivatives, and epoxy phenol-novolac resins; and glycidyl esters of aromatic carboxylic acids, e.g., phthalic acid diglycidyl ester, isophthalic acid diglycidyl ester, trimellitic acid triglycidyl ester, and pyromellitic acid tetraglycidyl ester, and mixtures thereof. Preferred aromatic polyepoxides are the polyglycidyl ethers of polyhydric phenols, such as the EPON™ series of diglycidyl ethers of Bisphenol-A, including EPON 828 and EPON 1001F, available commercially from Shell Chemicals, Inc., Houston, Tex.

Representative aliphatic cyclic polyepoxides (i.e., cyclic compounds containing one or more saturated carbocyclic rings and more than one epoxy group, also known as alicyclic compounds) useful in the present invention include the "ERL™" series of alicyclic epoxides commercially available from Union Carbide Corp., Danbury, Conn., such as vinyl cyclohexene dioxide (ERL-4206), 3,4-epoxycyclohexylmethyl-3',4'-epoxycyclohexane carboxylate (ERL-4221), 3,4-epoxy-6-methylcyclohexylmethyl-3', 4'-epoxy-6-methylcyclohexane carboxylate (ERL-4201), bis (3,4-epoxy-6-methylcylohexylmethyl)adipate (ERL-4289), dipentene dioxide (ERL-4269), as well as 2-(3,4-epoxycyclohexyl-5,1"-spiro-3",4"-epoxycyclohexane-1,3-dioxane, 4-(1,2-epoxyethyl)- 1,2-epoxycyclohexane and 2,2-bis(3,4-epoxycyclohexyl)propane. Preferred alicyclic polyepoxides are the ERL™ series.

Representative aliphatic polyepoxides (i.e., compounds containing no carbocyclic rings and more than one epoxy group) include 1,4-bis(2,3-epoxypropoxy)butane, polyglycidyl ethers of aliphatic polyols such as glycerol, polypropylene glycol, 1,4-butanediol, and the like, and the diglycidyl ester of linoleic dimer acid.

A wide variety of commercial epoxy resins are available and are listed or described in, e.g., the *Handbook of Epoxy Resins*, by Lee and Neville, McGraw-Hill Book Co., New York (1967), *Epoxy Resins, Chemistry and Technology*, Second Edition, C. May, ed., Marcell Decker, Inc., New York (1988), and *Epoxy Resin Technology*, P. F. Bruins, ed., Interscience Publishers, New York, (1968).

Any of the epoxy resins described therein may be useful in preparation of the materials of the present invention.

Any suitable curatives or catalysts may be employed. Curatives of the present invention can be photocatalysts or thermal curing agents. Preferably photocatalysts are employed.

Known photocatalysts include two general types: onium salts and cationic organometallic salts, which are both useful in the invention.

Onium salt photocatalysts for cationic polymerizations include iodonium and sulfonium complex salts. Useful aromatic iodonium complex salts are of the general formula:

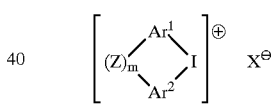

wherein $Ar^1$ and $Ar^2$ can be the same or different and are aromatic groups having from 4 to about 20 carbon atoms, and are selected from the group consisting of phenyl, thienyl, furanyl, and pyrazolyl groups;

Z is selected from the group consisting of oxygen, sulfur, a carbon-carbon bond,

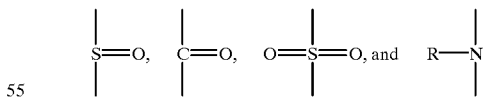

wherein R can be aryl (having from 6 to about 20 carbon atoms, such as phenyl) or acyl (having from 2 to about 20 carbon atoms, such as acetyl, or benzoyl), and

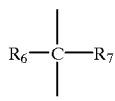

wherein $R_6$ and $R_7$ are selected from the group consisting of hydrogen, alkyl radicals having from 1 to about 4 carbon atoms, and alkenyl radicals having from 2 to about 4 carbon atoms;

m is zero or 1; and

X may have the formula $DQ_n$, wherein D is a metal from Groups IB to VIII or a metalloid from Groups IIIA to VA of the Periodic Chart of the Elements (Chemical Abstracts version), Q is a halogen atom, and n is an integer having a value of from 1 to 6. Preferably, the metals are copper, zinc, titanium, vanadium, chromium, magnesium, manganese, iron, cobalt, or nickel and the metalloids preferably are boron, aluminum, antimony, tin, arsenic and phosphorous. Preferably, the halogen, Q, is chlorine or fluorine. Illustrative of suitable anions are $BF_4^-$, $PF_6^-$, $SbF_6^-$, $FeCl_4^-$, $SnCl_5^-$, $AsF_6^-$, $SbF_5OH^-$, $SbCl_6^-$, $GaCl_4^-$, $InF_4^-$, $ZrF_6^-$, $B(C_6F_5)_4^-$, $CF_3SO_3^-$, and the like. Preferably, the anions are $BF_4^-$, $PF_6^-$, $SbF_6^-$, $AsF_6^-$, $SbF_5OH^-$, and $SbCl_6^-$. More preferably, the anions are $SbF_6^-$, $AsF_6^-$, and $SbF_5OH^-$.

Additional anions useful as the anionic portion of the catalysts and initiators of the present invention have been described in U. S. Pat. No. 5,554,664, incorporated herein by reference. The anions may be generally classified as fluorinated (including highly fluorinated and perfluorinated) tris alkyl- or arylsulfonyl methides and corresponding bis alkyl- or arylsulfonyl imides, as represented by Formulas I and II, respectively, and hereinafter referred to as "methide" and "imide" anions, respectively, for brevity, $$(R_fSO_2)_3C^- \quad \quad (I)$$

$$(R_fSO_2)_2N^- \quad \quad (II)$$

wherein each $R_f$ is independently selected from the group consisting of highly fluorinated or perfluorinated alkyl or fluorinated aryl radicals. The methides and imides may also be cyclic, when a combination of any two $R_f$ groups are linked to form a bridge.

The $R_f$ alkyl chains may contain from 1–20 carbon atoms, with 1–12 carbon atoms preferred. The $R_f$ alkyl chains may be straight, branched, or cyclic and preferably are straight. Heteroatoms or radicals such as divalent oxygen, trivalent nitrogen or hexavalent sulfur may interrupt the skeletal chain, as is well recognized in the art. When $R_f$ is or contains a cyclic structure, such structure preferably has 5 or 6 ring members, 1 or 2 of which can be heteroatoms. The alkyl radical $R_f$ is also free of ethylenic or other carbon-carbon unsaturation: e.g., it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group, and that any hydrogen atoms beyond the at least half replaced with fluorine that are not replaced with fluorine be replaced with bromine and or chlorine. It is more preferred that at least two out of three hydrogens on the alkyl group be replaced with fluorine, still more preferred that at least three of four hydrogen atoms be replaced with fluorine and most preferred that all hydrogen atoms be replaced with fluorine to form a perfluorinated alkyl group.

The fluorinated aryl radicals of Formulas I and II may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., $CF_3$.

Examples of anions useful in the practice of the present invention include: $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(C_4F_9SO_2)_3C^-$, $(CF_3SO_2)_2(C_4F_9SO_2)C^-$, $(CF_3SO_2)(C_4F_9SO_2)N^-$, $[(CF_3)_2NC_2F_4SO_2]_2N^-$, $(CF_3)_2NC_2F_4SO_2C^-(SO_2CF_3)_2$, $(3,5\text{-bis}(CF_3)C_6H_3)SO_2N^-SO_2CF_3$,

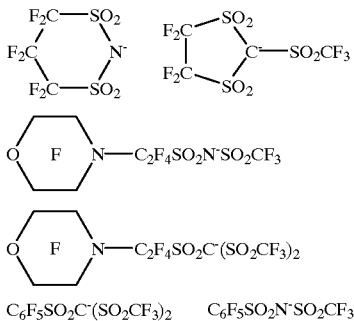

 N—$C_2F_4SO_2N^-SO_2CF_3$

 N—$C_2F_4SO_2C^-(SO_2CF_3)_2$ $C_6F_5SO_2C^-(SO_2CF_3)_2$   $C_6F_5SO_2N^-SO_2CF_3$ and the like. More preferred anions are those described by Formula I wherein $R_f$ is a perfluoroalkyl radical having 1–4 carbon atoms.

The $Ar_1$ and $Ar_2$ aromatic groups may optionally comprise one or more fused benzo rings (e.g., naphthyl, benzothienyl, dibenzothienyl, benzofuranyl, dibenzofuiranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828, which is incorporated herein by reference.

The aromatic iodonium complex salts useful in the invention are photosensitive only in the ultraviolet region of the spectrum. However, they can be sensitized to the near ultraviolet and the visible range of the spectrum by sensitizers for known photolyzable organic halogen compounds. Illustrative sensitizers include aromatic amines and colored aromatic polycyclic hydrocarbons, as described in U.S. Pat. No. 4,250,053, incorporated herein by reference.

Aromatic sulfonium complex salt catalysts suitable for use in the invention are of the general formula

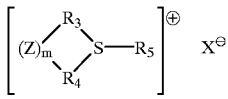 $X^\ominus$ wherein $R_3$, $R_4$ and $R_5$ can be the same or different, provided that at least one of the groups is aromatic. These groups can be selected from the group consisting of aromatic moieties having from 4 to about 20 carbon atoms (e.g., substituted and unsubstituted phenyl, thienyl, and furanyl) and alkyl radicals having from 1 to about 20 carbon atoms. The term "alkyl" includes substituted alkyl radicals (e.g., substituents such as halogen, hydroxy, alkoxy, and aryl). Preferably, $R_3$, $R_4$ and $R_5$ are each aromatic; and Z, m and X are all as defined above with regard to the iodonium complex salts.

If $R_3$, $R_4$ or $R_5$ is an aromatic group, it may optionally have one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Triaryl-substituted salts such as triphenylsulfonium hexafluoroantimonate and p-(phenyl(thiophenyl)) diphenylsulfonium hexafluoroantimonate are preferred sulfonium salts. Triphenylsulfonium hexafluoroantimonate ($Ph_3SSbF_6$) is a most preferred catalyst. Useful sulfonium salts are described more fully in U.S. Pat. No. 5,256,828. A prefered iodonium is $Ar_2ISbF_6$ (SarCat CD1012, available from Sartomer Company, Exton, Pa.).

Aromatic sulfonium complex salts useful in the invention are photosensitive only in the ultraviolet region of the spectrum. However, they can be sensitized to the near ultraviolet and the visible range of the spectrum by a select group of sensitizers such as described in U.S. Pat. Nos. 4,256,828 and 4,250,053.

Suitable photoactivatable organometallic complex salts useful in the invention include those described in U.S. Pat. Nos. 5,059,701, 5,191,101, and 5,252,694, each of which is incorporated herein by reference. Such salts of organometallic cations have the general formula:

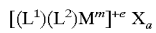

$$[(L^1)(L^2)M^m]^{+e} X_a$$

wherein $M^m$ represents a metal atom selected from elements of periodic groups IVB, VB, VIB, VIIB and VIII, preferably Cr, Mo, W, Mn, Re, Fe, and Co; $L^1$ represents none, one, or two ligands contributing π-electrons that can be the same or different ligand selected from the group consisting of substituted and unsubstituted acyclic and cyclic unsaturated compounds and groups and substituted and unsubstituted carbocyclic aromatic and heterocyclic aromatic compounds, each capable of contributing two to twelve π-electrons to the valence shell of the metal atom $M^m$. Preferably, $L^1$ is selected from the group consisting of substituted and unsubstituted $η^3$-allyl, $η^5$-cyclopentadienyl, $η^7$-cycloheptatrienyl compounds, and $η^6$-aromatic compounds selected from the group consisting of $η^6$-benzene and substituted $^6$-benzene compounds (e.g., xylenes) and compounds having 2 to 4 fused rings, each capable of contributing 3 to 8 π-electrons to the valence shell of $M^m$; $L^2$ represents none or 1 to 3 ligands contributing an even number of σ-electrons that can be the same or different ligand selected from the group consisting of carbon monoxide, nitrosonium, triphenyl phosphine, triphenyl stibine and derivatives of phosphorous, arsenic and antimony, with the proviso that the total electronic charge contributed to $M^m$ by $L^1$ and $L^2$ results in a net residual positive charge of e to the complex; and e is an integer having a value of 1 or 2, the residual charge of the complex cation; X is a halogen-containing complex anion, as described above, and a is 1 or 2, the number of complex anions which neutralize the charge e on the complex cation.

Certain thermally-activated curing agents for epoxy resins (e.g., compounds that effect curing and crosslinking of the epoxide by entering into a chemical reaction therewith) can be useful in the present invention. Preferably, such curing agents are thermally stable at temperatures at which mixing of the components takes place.

Suitable thermal curing agents include aliphatic and aromatic primary and secondary amines, e.g., di(4-aminophenyl)sulfone, di(4-aminophenyl)ether, and 2,2-bis-(4-aminophenyl)propane; aliphatic and aromatic tertiary amines, e.g., dimethylaminopropylamine and pyridine; quaternary ammonium salts, particularly pyridinium salts such as N-methyl-4-picolinium hexafluorophosphate; sulfoninum salts; fluorene diamines, such as those described in U.S. Pat. No. 4,684,678, incorporated herein by reference; boron trifluoride complexes such as $BF_3Et_2O$ and $BF_3·H_2NC_2H_5OH$; imidazoles, such as methylimidiazole; hydrazines, such as adipohydrazine; and guanidines, such as tetramethylguanidine and dicyandiamide (cyanoguanimide, commonly known as DiCy).

Additional high temperature thermal epoxy catalysts that can be particularly useful in the present invention include simple pyridinium, quinolinium, indolinium, benzothiazolium, alkyl, aryl and alkylaryl ammonium, sulfonium and phosphonium salts. These are effective initiators of the cationic polymerization of epoxies in the 250–350° C. temperature range. Useful ammonium and phosphonium salts are described in PTC application WO 98/08906, the teachings of which are incorporated herein by reference.

Catalysts useful in the invention can be present in an amount in the range of 0.01 to 10 weight percent, based on total epoxy resin composition, preferably 0.01 to 5 weight percent, and most preferably 0.5 to 3 weight percent. Catalysts may be added to the chosen epoxy in a powder form at temperatures up to about 150° C. No solvent is necessary for this operation. Incorporation time can range from 10–20 minutes depending on the epoxy/catalyst system. Alternatively, the catalyst could be added directly into the (meth)acrylate/epoxy mixture during melt blending.

In addition, the adhesive composition may also comprise a polyol. The polyol is preferably reactive with epoxy groups under curing conditions. The polyol is preferably adjusted to optimize cure speed and final adhesive performance. The polyol may be included in a weight ratio, relative to the epoxy component, of between 5/95 to 40/60, preferably from 10/90 to 30/70. If the polyol level is greater, the cured material becomes too soft and good adhesive performance may be lost.

Examples of such polyols include ethylene glycol, 1,2- and 1,3-propane diol, 1,2-, 1,3-, 1,4- and 2,3-butane diol, 1,5-pentane diol, 1,6-hexane diol, 1,8-octane diol, neopentyl glycol, 1,4-bishydroxymethyl cyclohexane (1,4-cyclohexane dimethanol), 2-methyl-1,3-propane diol, dibromobutene diol, glycerol, trimethylolpropane, 1,2,6-hexanetriol, 2,2-dimethyl-1,3-propane diol, 1,6- and 2,5-hexane diol, 1,12-dodecane diol, 1,12- and 1,18-octadecane diol, 2,2,4- and 2,4,4-trimethyl-1,6-hexane diol, cyclohexane-1,4-diol, 2,2-bis-(4-hydroxycyclohexyl) propane, bis-(4-hydroxyphenyl)-methane, bis-(4-hydroxyphenyl)-sulphone, 1,4-bis-(hydroxymethyl)-benzene, 1,4-dihydroxy-benzene, 2,2-bis-(4-hydroxyphenyl) -propane, 1,4-bis-((o-hydroxyethoxy)-benzene, 1,3-bis-hydroxyalkyl hydantoins, tris-hydroxyalkyl isocyanurates and tris-hydroxyalkyl-triazolidane-3,5-diones, trimethylolethane, pentaerythritol, quinitol, mannitol, sorbitol, diethylene glycol, triethylene glycol, tetraethylene glycol, dipropylene glycol, higher polypropylene glycols, higher polyethylene glycols, higher polybutylene glycols, 4,4'-dihydroxy diphenylpropane, dihydroxymethyl hydroquinone, and combinations thereof.

Higher molecular weight polyols include the polyethylene and polypropylene oxide polymers in the molecular weight range of from about 200 to about 20,000, such as the Carbowax™ series of poly(ethylene oxide) compounds (available from Union Carbide Corp., Danbury, Conn.), and Voranol™ polyether polyols available from Dow Chemical Co., Midland, Mich., caprolactone polyols in the molecular weight range of from about 200 to about 5000, such as the Tone™ series of polyols (available from Union Carbide), poly(tetramethylene ether) glycols in the molecular weight range of from about 200 to about 4000, such as the Terethane™ series of polyols (available from DuPont Co., Wilmington, Del.), hydroxy-terminated polybutadiene materials, such as the Poly bd™ series of polyols (available from Elf Atochem, Philadelphia, Pa.), polycarbonate diols, such as KM-10-1667™ and KM-10-1733™ (available from Stahl USA, (Peabody, Ma.), poyurethane diols, such as K-flex UD-320-100™ (available from King Industries, Norwalk, Conn.), aromatic polyether polyols, such as Synfac 8024™ (available from Milliken Chemical, Spartanburg, S.C.), and random copolymers of poly(tetramethylene oxide)/polycarbonate, such as the PolyTHF™ CD series of polyols (available from BASF Corporation, Mount Olive, N.J.). Preferred polyester polyols include the Desmophen™ family, available from Bayer, Elkart, IN. A preferred acrylic polyol is Joncryl™ 587, commercially available from S. C. Johnson & Son, Inc., Racine, Wis.

Another group of preferred polyols consists of hydroxyalkylated bisphenol derivatives. Preferred polyols in this group have the following general formula:

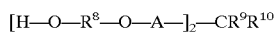

$[H-O-R^8-O-A-]_2-CR^9R^{10}$ wherein $R^8$ is either a straight or branched or cyclic alkylene (e.g., methylene, ethylene, butylene, decylene) group consisting of 1 to 10 carbon atoms, or an aralkylene group consisting of 7 to 14 carbon atoms (e.g., benzylidene, 1,2-diphenylethylene, phenethylene); $R^9$ and $R^{10}$ independently may be an alkyl group, aralkyl group, cycloalkyl group, alkaryl group, or an aryl group of from 1 to about 30 carbon atoms (preferably methyl, ethyl, and trifluoromethyl) and none or from 1 to about 10 heteroatoms, and $R^9$ and $R^{10}$ together can comprise an alkylene, cycloalkylene, arylene, alkarylene or aralkylene group containing from 2 to about 660 carbon atoms and none or from 1 to about 10 heteroatoms;

A can be a substituted or unsubstituted arylene group, preferably having from 6 to about 12 carbon atoms, most preferably p-phenylene, o-phenylene or dimethylnaphthalene.

Specific preferred hydroxyalkylated bisphenols include 9,9-bis-4-(2-hydroxyethyoxphenyl)fluorene (i.e., hydroxyethylated bisphenol of fluorenone), 2,2-bis-4-(2-hydroxyethoxyphenyl)butane (i.e., hydroxyethylated bisphenol of 2-butanone), 2,2-bis-4-(2-hydroxyethyoxphenyl)hexafluoropropane (i.e., hydroxyethylated bisphenol F), 1,2-bis-4-(2-hydroxyethyoxphenyl)propane, 2,2-bis-4-(2-hydroxyethoxyphenyl)norbornane, 2,2-bis-4-(2-hydroxyethoxyphenyl)-5,6-cyclopentanonorbomane, and 1,1-bis-4-(2-hydroxyethoxyphenyl)cyclohexane.

Preferred examples of such polyols are diethylene glycol, triethylene glycol, dipropylene glycol, tripropylene glycol, dibutylene glycol, 1,4-bis-(2-hydroxyethoxy)cyclohexane, 1,4-bis-(2-hydroxyethoxy-methyl)-cyclohexane, 1,4-bis-(2-hydroxyethoxy)-benzene, 4,4'-bis-(2-hydroxyethoxy)-diphenylmethane, -2-diphenyl-propane, -diphenyl ether, -diphenyl sulphone, -diphenyl ketone and -diphenyl cyclohexane.

Polyether polyols, polyester polyols and hydroxy-terminated polybutadiene polyols are most prefered.

The (meth)acrylate terpolymer, epoxy resin component, epoxy cure agent and optional polyol my be blended by any suitable method and in any suitable order. Blending may be done by a continuous process or a batchwise process. Where photocatalysts are used, mixing of epoxy-functional materials with catalyst should occur under reduced lighting conditions. In that case, other components may be advantageously mixed prior to addition of catalyst. Mixing may be done at any suitable temperature but may proceed more readily at elevated temperatures. In some cases it may be preferable to use a mechanical mixer such as a Brabender internal mixer (C. W. Brabender Instruments, Inc., South Hackensack, N.J.) for times of 3–30 minutes.

Adhesives of the present invention may be liquid or solid, but are preferably viscous liquids having viscosities which allow coating or syringe applications, typically between 10,000 and 100,000 cps. Prior to cure, the adhesives of the present invention are advantageously sufficiently tacky to perform as pressure sensitive adhesives. Cure may be initiated by activation of adhesive, either before or after affixing, by application of heat or radiation, including UV light, visible light, or other electromagnetic radiation, or electron beam exposure, or any combination of the foregoing. Cure may then be allowed to proceed to completion. Preferably heat is applied after affixing to accelerate completion of cure. Upon cure, adhesives of the present invention preferably harden to a structural adhesive bond.

Other ingredients or adjuvants maybe employed to impart or modify properties of the adhesive. Preferably no more than 50% by weight of the composition is composed of adjuvants, such as: monomeric and multifunctional acrylates, reactive diluents, i.e. monoepoxides, plasticizers and oils to impart flexibility, fillers (i.e. glass or plastic bubbles, metal oxides, ceramics and minerals such as talc, clays, silica, silicates and the like), tougheners i.e. incompatible dispersions of elastomeric particles, thermoplastic and tackifying resins, solvents, stabilizers, pigments, dyes and adhesion promoters such as silanes to modify tack green strength build up, flexibility, toughness adhesion, etc. Adjuvants should be added at a level that does not adversely interfere with the properties of the invention.

This invention is useful as a component of self-fixturing adhesives.

Objects and advantages of this invention are further illustrated by the following examples, but the particular materials and amounts thereof recited in these examples, as well as other conditions and details, should not be construed to unduly limit this invention.

EXAMPLES

Reagents

Unless otherwise noted, all chemicals and reagents were obtained or are available from Aldrich Chemical Co., Milwaukee, Wis.

The following chemicals and reagents were used:

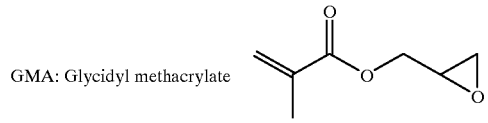

GMA: Glycidyl methacrylate

A-200: 3,4-epoxycyclohexylmethyl acrylate

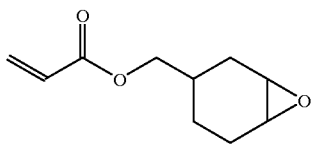

M-100: 3,4-epoxycyclohexylmethyl methacrylate

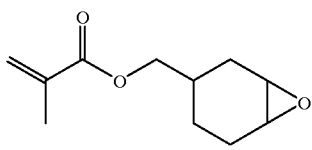

IOA: Iso-octyl acrylate

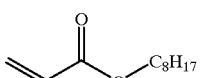

ODA: Octadecyl acrylate

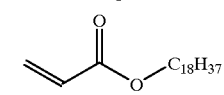

IBOA: Isobornyl acrylate

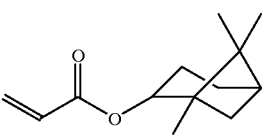

PhEA: 2-Phenoxyethyl acrylate

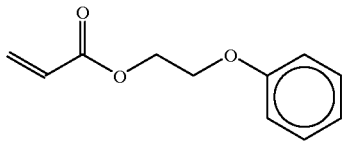

ERL 4221 & UVR-6110:
3,4-epoxycyclohexylmethyl-3',4'-epoxycyclohexane carboxylate

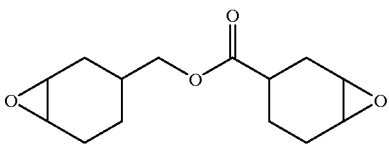

Epon 828: diglycidyl ether of Bisphenol A

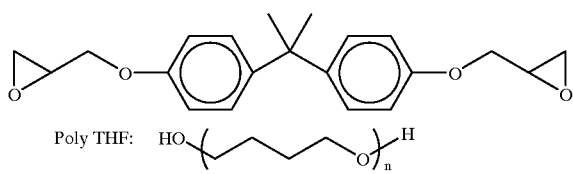

Poly THF:

Cyclomer™ A-200 (essentially 3,4-epoxycyclohexylmethyl acrylate) is available from Daicel Chemical Industries, Ltd., Osaka, Japan.

Cyclomer™ M-100 (essentially 3,4-epoxycyclohexylmethyl methacrylate) is available from Daicel.

IBOA (isobornylacrylate) is available from Sartomer Company, Exton, Pa.

PEA (2-phenoxy ethyl acrylate) is available from Sartomer Company, Exton, Pa.

Poly THF is available in from BASF Corp., Mount Olive, N.J., in various average molecular weight compositions.

Epon 828 (diglycidyl ether of Bisphenol A) is available from Shell Chemical Co., Houston, Tex.

ERL 4221 (essentially 3,4-epoxycyclohexylmethyl 3',4'-epoxycyclohexane carboxylate) is available from Union Carbide Corp., Danbury, Conn.

UVR-6110 (essentially 3,4-epoxycyclohexylmethyl 3',4'-epoxycyclohexane carboxylate) is available from Union Carbide Corp.

IOTG (iso-octyl thioglycolate) is available from WR Grace, Boca Raton, Fla.

Two epoxy photocatalyst systems were used, designated S-cat and CD1012. S-cat is $Ph_3SSbF_6$, which may be prepared as described in PCT Application No. WO 98/08906, Example 2. S-cat may be activated by light, heat or both. As used herein, CD1012 is a mixture of SarCat CD1012 ($Ph_2ISbF_6$, available from Sartomer Co. Inc., Exton, Pa.), a sensitizer (camphorquinone, available from Aldrich), and a donor, EDMAB (ethyl p-dimethylamino benzoate, available from Aldrich). The three components are mixed in the weight ratio 1.5/0.5/0.5, as described in PCT Application No. WO 98/47046, in particular at Example 8.

Formulation of Adhesives

Acrylate terpolymers were made by process A or B, following:

In process A, acrylate monomers were mixed and 100 parts by weight of the mixture was dissolved in 400 parts by weight of butyl acetate in a 3-neck flask equipped with a magnetic stirring bar and stirrer and apparatus to supply a stream of dry nitrogen. While the mixture was stirred under nitrogen, 0.25% by weight of AIBN was added as a thermal free radical initiator. The mixture was stirred for an hour at room temperature and then stirred overnight at 65–70° C. After cooling to room temperature, the resulting viscous solution was coagulated by addition of an excess of methanol and the solid residue was dried under vacuum.

In process B, acrylate monomers were mixed and the mixture dissolved in equal parts by weight of ethyl acetate in sealed bottles with 0.5% AIBN as a thermal free radical initiator and about 1% by weight of IOTG as a chain transfer agent to control molecular weight. The bottles were aggitated at 55–60° C. for 24 hours in a launderometer. The resulting products were purified by removing the ethyl acetate using a rotovap followed by heating in a vacuum oven at 90° C. overnight to remove any residual solvent and monomer.

Acrylate/epoxy adhesive compositions were made by process C, D or E, as follows:

In process C, high epoxy resin content mixtures were blended by combining the acrylate terpolymer, epoxy resin and photocatalyst system using a pneumatic stirrer for three minutes at 180° C.

In process D, lower epoxy resin content mixtures were blended by combining the acrylate terpolymer, epoxy resin and photocatalyst system in a Brabender internal mixer (C. W. Brabender Instruments, Inc., South Hackensack, N.J.) equipped with sigma blades for five minutes at 100° C.

In process E, the acrylate terpolymer, epoxy resin and any added polyol (polyTBF 250) were blended together by hand at a slightly elevated temperature, about 60° C., and then cooled to room temperature. Then, in a darkened room, the photocatalyst system was added and hand mixed.

Table I presents adhesive compositions that were made by blending X % by weight of the indicated epoxy resin with Y % by weight of an acrylic terpolymer made from a mixture of J % by weight of the indicated epoxy-functional monomer, K % by weight of the indicated tackifier monomer, and L % by weight of the indicated compatibilizer monomer, according to the indicated process A, B, C, D or E discussed above. Example numbers followed by a C are comparative Examples.

TABLE I

| Ex. No. | Process | Y % | J % | e.m. | K % | t.m. | L % | c.m. | X % | epoxy | catalyst | polyol % |
|---|---|---|---|---|---|---|---|---|---|---|---|---|
| 1C | A, D | 80 | 20 | GMA | 80 | ODA | — | — | 20 | 828 | S-cat | — |
| 2C | A, C | 50 | 20 | GMA | 80 | ODA | — | — | 50 | 828 | S-cat | — |
| 3C | A, C | 20 | 20 | GMA | 80 | ODA | — | — | 80 | 828 | S-cat | — |
| 4C | A, D | 80 | 20 | GMA | 80 | ODA | — | — | 20 | 4221 | S-cat | — |
| 5C | A, C | 50 | 20 | GMA | 80 | ODA | — | — | 50 | 4221 | S-cat | — |
| 6C | A, C | 20 | 20 | GMA | 80 | ODA | — | — | 80 | 4221 | S-cat | — |
| 7 | A, D | 100 | 10 | GMA | 70 | IOA | 20 | PEA | — | — | S-cat | — |
| 8 | A, D | 80 | 10 | GMA | 70 | IOA | 20 | PEA | 20 | 828 | S-cat | — |
| 9 | A, C | 50 | 10 | GMA | 70 | IOA | 20 | PEA | 50 | 828 | S-cat | — |
| 10 | A, C | 20 | 10 | GMA | 70 | IOA | 20 | PEA | 80 | 828 | S-cat | — |
| 11 | A, D | 80 | 10 | GMA | 70 | IOA | 20 | PEA | 20 | 4221 | S-cat | — |
| 12 | A, C | 50 | 10 | GMA | 70 | IOA | 20 | PEA | 50 | 4221 | S-cat | — |
| 13 | A, C | 20 | 10 | GMA | 70 | IOA | 20 | PEA | 80 | 4221 | S-cat | — |
| 14 | A, C | 50 | 10 | GMA | 70 | IOA | 20 | PEA | 50 | 828 | S-cat | — |
| 15 | A, C | 50 | 10 | GMA | 70 | IOA | 20 | PEA | 50 | 4221 | S-cat | — |
| 16 | B, E | 50 | 5 | A-200 | 5 / 30 | IOA / IBOA | 60 | PEA | 37.5 | 6110 | CD1012 | 12.5 |
| 17 | B, E | 70 | 5 | A-200 | 5 / 30 | IOA / IBOA | 60 | PEA | 18 | 6110 | CD1012 | 12 |
| 18C | B, E | 50 | 10 | A-200 | 30 / 60 | IOA / IBOA | 0 | PEA | 37.5 | 6110 | CD1012 | 12.5 |
| 19 | B, E | 50 | 5 | A-200 | 24 / 6 | IOA / IBOA | 65 | PEA | 37.5 | 6110 | CD1012 | 12.5 |
| 20 | B, E | 50 | 5 | A-200 | 12.5 / 17.5 | IOA / IBOA | 65 | PEA | 37.5 | 6110 | CD1012 | 12.5 |
| 21C | B, E | 50 | 0 | A-200 | 5.3 / 31.6 | IOA / IBOA | 63.1 | PEA | 37.5 | 6110 | CD1012 | 12.5 |
| 22 | B, E | 30 | 5 | A-200 | 5 / 30 | IOA / IBOA | 60 | PEA | 63 | 6110 | CD1012 | 7 |
| 23 | B, E | 70 | 5 | A-200 | 5 / 30 | IOA / IBOA | 60 | PEA | 27 | 6110 | CD1012 | 3 |
| 24 | B, E | 30 | 5 | A-200 | 0 / 36 | IOA / MMA | 59 | PEA | 52.5 | 6110 | CD1012 | 17.5 |
| 25 | B, E | 30 | 5 | A-200 | 0 / 42 | IOA / IBOA | 53 | PEA | 52.5 | 6110 | CD-1012 | 17.5 |

Observations and Results

Table II reports observations made of samples 1–13 upon mixing, both before and after cure. Cure was accomplished by spreading a small amount of the mixture on an aluminum coupon and heating to 180° C. before exposure to a sylvania 350 blacklight bulb at a distance of 1 cm for 5 minutes.

TABLE II

| Ex. No. | Observations before Cure | Observations after Cure |
|---|---|---|
| 1C | yellow-white solid | uniform solid, little adhesion |
| 2C | white soft solid | non-uniform solid, low adhesion |
| 3C | two layers | non-uniform solid, higher adhesion |
| 4C | white solid | uniform solid, higher adhesion |
| 5C | white soft solid | uniform solid, brittle, higher adhesion |
| 6C | non-uniform | yellow solid, brittle, low adhesion |
| 7 | white gel | brown solid, low adhesion |
| 8 | white gel | non-uniform solid, higher adhesion |
| 9 | less uniform gel | non-uniform solid, higher adhesion |
| 10 | non-uniform | non-uniform solid, higher adhesion |
| 11 | clear gel | clear solid, high adhesion |
| 12 | clear thick liquid | clear solid, high adhesion |
| 13 | clear liquid | yellow solid, low adhesion |

Comparison of Examples 1C–3C with Examples 8–10 and Examples 4C–6C with Examples 11–13 indicates that use of the acrylate of the present invention, made with compatibilizing monomer, yielded a more uniform adhesive, even up to epoxy resin content levels of 80% (compare Examples 6C and 13).

Overlap shear strength was measured for Examples 10 and 12 as follows: A small amount of each material was applied to the final 2.54 cm of ten aluminum coupons measuring 127×25×0.64 mm. The coupons were irradiated with UV om a Sylvania 350 blacklight at a distance of 1 cm for 10 seconds. ately afterward two coupons were placed together end to end and wrapped at resistant tape (Type 5409 PTFE Extruded Film Tape, 3M, St. Paul, Minn.). The samples were pressed with minimal pressure at 200° C. for five minutes. The shear samples were then tested for adhesion using an Instron tensile testing machine, Model 1122 (Instron Corp., Park Ridge, Ill.), where the gauge length was 5.08 cm and the crosshead speed was 5.08 cm/min. Five measurements were taken for each Example at room temperature. Examples 10 and 12 showed overlap shear adhesion levels of 3,643 kPa and 1,001 kPa, respectively.

Table III reports the results when Examples 14 and 15 were tested for adhesion to copper, steel, and steel having a thin coating of MP404 oil (Henkel Surface Technologies, Madison Heights, Mich.) in the indicated amount. A thin film of the adhesive was placed on the substrate and heated or left at room temperature, as indicated, and then exposed to UV from a Sylvania 350 blacklight bulb at a distance of 1 cm for 5 minutes. In the case of the oily steel substrate, the adhesive was allowed to sit for the indicated dwell time prior to cure.

TABLE III

| Ex. | Substrate | Oil (mg/cm$^2$) | Dwell Time (min) | Cure temp (° C.) | Adhesion |
|---|---|---|---|---|---|
| 14 | Copper | 0 | NA | 230 | high |
| 15 | Copper | 0 | NA | 230 | high |
| 14 | Steel | 0 | NA | 230 | high |
| 15 | Steel | 0 | NA | 230 | high |
| 14 | Oily Steel | 0.16 | 5 | 250 | good |
| 15 | Oily Steel | 0.16 | 5 | 250 | good |
| 14 | Oily Steel | 0.23 | 10 | room temp | good |
| 15 | Oily Steel | 0.23 | 10 | room temp | good |
| 14 | Oily Steel | 0.27 | 5 | room temp | good |
| 15 | Oily Steel | 0.27 | 5 | room temp | good |
| 14 | Oily Steel | 0.36 | 10 | 275 | high |
| 15 | Oily Steel | 0.36 | 10 | 275 | lower |

Compatibility observations were made for the formulations of Examples 16–25 as follows: The acrylate and epoxy resin components were hand mixed at 121° C. until well blended. The blends were visually inspected and rated on a scale of 1 to 5, with 1 representing clear and 5 representing gross phase separation. The formulations of Examples 16, 17, 19, 20 and 22–25, which all contained the terpolymers of the present invention, were rated 1 (clear). The formulation of comparative Example 18C was rated 5 (gross phase separation). The observations are reported in Table IV.

TABLE IV

| Ex. | Compatibility | Light Exposure Time (sec) | Film Properties Tack/Toughness |
|---|---|---|---|
| 16 | 1 | 60 | Excellent |
| 17 | 1 | 60 | Excellent |
| 18C | 5 | 60 | Wet/poor |
| 19 | 1 | 60 | Good/fair |
| 20 | 1 | 60 | Good/fair |
| 21C | 2 (hazy) | 60 | Good/poor (waxy) |
| 22 | 1 | 40 | Poor/Good |
| 23 | 1 | 60 | Good/fair (soft) |
| 24 | 1 | 50 | Excellent |
| 25 | 1 | 50 | Excellent |

Table V reports viscosity, dead load, and overlap shear strength (OLSS) measurements for Examples 16–23.

Viscosity was measured using a Brookfield viscometer (Model DV-1 Brookfield Engineering Laboratories, Inc., Stouton, Ma.) having a helopathic spindel.

Dead load was measured as follows: A 0.125 mm film of the adhesive of the Example was coated onto a 6.45 sq. cm area of a cold rolled steel (CRS) ring 2.54×10.16 cm wiped with methyl ethyl ketone (MEK). The film was exposed using a halogen light source for the 60 sec. One minute open time was allowed and then a 2.54 cm wide primed polyester film was bonded with firm hand pressure to the activated adhesive. The bond was allowed to rest for 5 minutes and then a 100 g weight was hung from the construction. Time to fail and any creep distance was recorded.

Overlap shear bonds using the Example adhesives were prepared for testing using both cold rolled steel (CRS) and acid-etched aluminum (AEA) substrates. 3.23 cm$^2$ CRS bonds were prepared on MEK wiped substrates. A 2-surface bond was prepared by coating 0.125 mm of adhesive to each substrate, light activating the films for 60 sec., allowing 1 minutes open time, followed by bonding the films and clamping. The same bonding procedure was used with the acid-etched aluminum substrates except the step of wiping with MEK was deleted. The bonds were cued as indicated on Table V. Overlap shear strength was measured at room temperature using a tensile tester by Sintec. (MTS Systems Corp, Sintec Division, Cary, N.C.).

TABLE V

| Ex. | Viscosity (cps) | Dead load (min.) | OLSS on CRS 7 day cure at room temp (kPa) | OLSS on CRS 14 hr. cure at 80° C. (kPa) | OLSS on AEA 7 day cure at room temp (kPa) | OLSS on AEA 14 hr. cure at 80° C. or *100 min. cure at 121° C. (kPa) |
|---|---|---|---|---|---|---|
| 16 | 60,000 | >60 | 3172 | 6412 | 3447 | 8274 |
| 17 | 1,650,000 | >60 | | 4640 | | |
| 19 | 30,000 | 7 | 193 | 1937 | | |
| 20 | 50,000 | 6 | 483 | 1317 | | |
| 21C | 50,000 | >60 | | 3454 | | |
| 22 | 5,700 | 30 | | 4061 | | |
| 23 | 720,000 | 25 | | 2792 | | |
| 24 | 20,000 | >60 | | 8963 | 8274 | 10342 14479* |
| 25 | 9,000 | >60 | | 5516 | 6895 | |

Various modifications and alterations of this invention will become apparent to those skilled in the art without departing from the scope and principles of this invention, and it should be understood that this invention is not to be unduly limited to the illustrative embodiments set forth hereinabove. All publications and patents are herein incorporated by reference to the same extent as if each individual publication or patent was specifically and individually indicated to be incorporated by reference.

We claim:

1. A composition comprising a terpolymerized component comprising:
   a) 1–30% of total terpolymer weight of epoxy-functional (meth)acrylate monomer units,
   b) 1–98% of total terpolymer weight of tackifier (meth) acrylate monomer units, and
   c) 1–98% of total terpolymer weight of compatibilizing (meth)acrylate monomer units, wherein said compatibilizing (meth)acrylate monomer units are (meth) acrylic esters derived from aromatic alcohols containing 6–14 carbon atoms, and wherein said epoxy-functional (meth)acrylate monomer units contain an epoxycyclohexyl group.

2. A composition comprising a terpolymerized component comprising:
   a) 1–30% of total terpolymer weight of epoxy-functional (meth)acrylate monomer units,
   b) 1–98% of total terpolymer weight of tackifier (meth) acrylate monomer units, and
   c) 1–98% of total terpolymer weight of compatibilizing (meth)acrylate monomer units, wherein said compatibilizing (meth)acrylate monomer units are (meth) acrylic ester derived from aromatic alcohols containing 6–14 carbon atoms; additionally comprising a polyol, wherein said polyol is selected from the group consisting of polyalkylene polyols, polyether polyols, polyester polyols and polydiene polyols.

3. A composition comprising a terpolymerized component comprising:
  a) 1–30% of total terpolymer weight of epoxy-functional (meth)acrylate monomer units,
  b) 1–98% of total terpolymer weight of tackifier (meth)acrylate monomer units, and
  c) 1–98% of total terpolymer weight of compatibilizing (meth)acrylate monomer units, wherein said compatibilizing (meth)acrylate monomer units are (meth) acrylic ester derived from aromatic alcohols containing 6–14 carbon atoms, additionally comprising a polyol, wherein said polyol is a polyether polyol.

4. A composition comprising a terpolymerized component comprising:
  a) 1–30% of total terpolymer weight of epoxy-functional (meth)acrylate monomer units,
  b) 1–98% of total terpolymer weight of tackifier (meth)acrylate monomer units, and
  c) 1–98% of total terpolymer weight of compatibilizing (meth)acrylate monomer units, wherein said compatibilizing (meth)acrylate monomer units are (meth) acrylic ester derived form aromatic alcohols containing 6–14 carbon atoms; additionally comprising a polyol, wherein said polyol is poly(tetrahydrofuran).

* * * * *

UNITED STATES PATENT AND TRADEMARK OFFICE
CERTIFICATE OF CORRECTION

PATENT NO. : 6,235,850 B1
DATED : May 22, 2001
INVENTOR(S) : Perez, Mario A.

It is certified that error appears in the above-identified patent and that said Letters Patent is hereby corrected as shown below:

Title page,
Item [75], Inventors, "Ikuko Ebihara, St. Paul;" should read -- Ikuko Ebihara, Kanagawa, Japan; --
Item [73], Assignee, delete "Immovative" and insert -- Innovative --.

Column 2,
Line 42, "finctional" should read -- functional --.
Line 61, "(VAZ$^{TM}$50)" should read -- (VAZO$^{TM}$50) --.
Line 61, "(VAZ$^{TM}$52)" should read -- (VAZO$^{TM}$52) --.
Line 63, "(VAZ$^{TM}$67)" should read -- (VAZO$^{TM}$67) --.

Column 3,
Line 31, "intiators" should read -- initiators --.

Column 7,
Line 18, "$^{PF}6$" should read -- $PF_6$ --.

Column 8,
Line 29, "dibenzofuiranyl" should read -- dibenzofuranyl --.

Column 10,
Line 3, "$BF_3Et_2O$" should read -- $BF_3$•$Et_2O$ --.
Line 49, "1,4-bis-((o-hydroxyethoxy)-benzene" should read -- 1,4-bis-(ω-hydroxyethoxy)-benzene --.

Column 12,
Line 24, "maybe" should read -- may be --.

Column 14,
Line 7, "(isobomylacrylate)" should read -- (isobornylacrylate) --.
Line 11, delete "in".

Column 15,
Line 5, "(polyTBF 250)" should read -- (polyTHF250) --.
Line 58, "sylvania" should read -- Sylvania --.

Column 16,
Line 62, "ately" should read -- Immediately --.
Line 63, delete "at" and insert therefore -- with heat --.

UNITED STATES PATENT AND TRADEMARK OFFICE
CERTIFICATE OF CORRECTION

PATENT NO. : 6,235,850 B1
DATED : May 22, 2001
INVENTOR(S) : Perez, Mario A.

It is certified that error appears in the above-identified patent and that said Letters Patent is hereby corrected as shown below:

Column 17,
Line 37, "terpolymers" should read -- terpolymer --.
Line 63, delete "ing" and insert therefore -- substrate measuring --.

Column 19,
Line 2, "ester" should read -- esters --.
Line 16, "ester" should read -- esters --.

Column 20,
Line 1, "atoms," should read -- atoms; --.
Line 12, "ester" should read -- esters --.
Line 12, "form" should read -- from --.

Signed and Sealed this

Twenty-fifth Day of March, 2003

JAMES E. ROGAN
*Director of the United States Patent and Trademark Office*